(12) United States Patent
Chamberlain

(10) Patent No.: US 9,864,997 B2
(45) Date of Patent: Jan. 9, 2018

(54) SYSTEMS AND METHODS FOR SOLICITING SECONDARY INFORMATION WHILE MAINTAINING ACCESS TO PRIMARY INFORMATION

(75) Inventor: Charles R. Chamberlain, Arlington, VA (US)

(73) Assignee: United States Postal Service, Washington, DC (US)

(*) Notice: Subject to any disclaimer, the term of this patent is extended or adjusted under 35 U.S.C. 154(b) by 3250 days.

(21) Appl. No.: 10/362,092

(22) PCT Filed: Sep. 6, 2001

(86) PCT No.: PCT/US01/27482
§ 371 (c)(1),
(2), (4) Date: Feb. 21, 2003

(87) PCT Pub. No.: WO02/21380
PCT Pub. Date: Mar. 14, 2002

(65) Prior Publication Data
US 2003/0208369 A1   Nov. 6, 2003

Related U.S. Application Data

(60) Provisional application No. 60/231,298, filed on Sep. 8, 2000.

(51) Int. Cl.
*G06Q 30/02* (2012.01)
(52) U.S. Cl.
CPC ................... *G06Q 30/02* (2013.01)

(58) Field of Classification Search
CPC .................................................... G06Q 30/02
USPC ........................... 705/1, 14.4, 1.1; 709/217
See application file for complete search history.

(56) References Cited

U.S. PATENT DOCUMENTS

| 6,212,554 | B1* | 4/2001 | Roskowski ................... 709/217 |
| 6,278,993 | B1 | 8/2001 | Kumar et al. |
| 6,285,984 | B1 | 9/2001 | Speicher |
| 6,324,566 | B1 | 11/2001 | Himmel et al. |
| 6,338,082 | B1 | 1/2002 | Schneider |
| 6,907,566 | B1* | 6/2005 | McElfresh et al. ........... 715/210 |
| 6,968,383 | B1* | 11/2005 | Heutschi et al. ............. 709/228 |
| 2003/0229893 | A1* | 12/2003 | Sgaraglino ....... H04N 21/25883 725/37 |

OTHER PUBLICATIONS

U.S. Appl. No. 60/199,756.*

* cited by examiner

*Primary Examiner* — Dennis Ruhl
(74) *Attorney, Agent, or Firm* — Finnegan, Henderson, Farabow, Garrett & Dunner, L.L.P.

(57) ABSTRACT

Methods and systems to provide for a user to request information over a network and receive the requested information through one or more information channels. A user, through a client device, may access, through a network, a web page that is hosted on a server. The server, while providing primary information, may further provide an opportunity for the user to request secondary information. The user may request access to the secondary information, while maintaining access to the primary information. Included in the request may be a channel selection, and associated channel selection information, through which the user wishes to receive the information.

24 Claims, 11 Drawing Sheets

SYSTEMS AND METHODS FOR SOLICITING SECONDARY INFORMATION WHILE MAINTAINING ACCESS TO PRIMARY INFORMATION

RELATED APPLICATION DATA

This application is related to, and claims priority to, U.S. Provisional Application No. 60/231,298, filed Sep. 8, 2000, entitled "Systems and Methods for Pipeline Surfing" which is expressly incorporated herein by reference in its entirety.

DESCRIPTION OF THE INVENTION

Field of the Invention

This invention relates generally to soliciting information over a network, and more specifically, to requesting and providing access to secondary information while maintaining access to primary information.

Background of the Invention

Conducting commerce over electronic networks has enjoyed an explosive amount of growth in recent years. These activities, popularly known as e-commerce, have flourished over the Internet, generating a tremendous amount of revenue for producers of goods and services and providing consumers with an unparalleled level of choice and convenience.

In order to attract consumers and widen existing customer bases, providers of goods and services are utilizing advertising in the form of electronic solicitations. These solicitations are typically hosted on web pages whereby consumers may inquire about the electronic solicitation while accessing the Internet using a web browser. The user initiates these inquires by actively selecting the solicitation with a user input device, for example, a mouse. This selection of the solicitation forces the consumer to leave the web site they were currently browsing and accesses a web site that is associated with the solicitation. The new web page contains information related to the solicitation and the consumer is free to access other web pages contained in the web site. However, in order for the consumer to return to the original web page that contained the solicitation, the user would have to back through the new web pages associated with the solicitation. This process is cumbersome and time consuming. Further, sometimes the link to the original web page is lost and the consumer is forced to reenter the universal resource locator (URL) of the original web page.

As a result, because of the problems set forth above, consumers are no longer accessing the solicitations as frequently as they used to. Consumers may only look to access information regarding some solicitations while not accessing others. This results not only in decreased access of solicitations by consumers, but also lost revenue to the solicitors or advertisers because the information contained in their solicitations are not being viewed by consumers.

As a result, there is a need for a system that allows a consumer to request information relating to a solicitation while maintaining access to the original web page.

SUMMARY OF THE INVENTION

In accordance with the principles of the invention, as embodied and broadly described herein, methods and systems consistent with the principles of the present invention provide for accessing secondary source of information while maintaining access to a primary source of information, executed in a data processing system, including receiving a request to provide secondary information from a secondary source; presenting a plurality of channels whereby the secondary information is provided; receiving at least one channel selection and associated channel information for providing the secondary information; and providing the secondary information through at least one specified channel while not interfering with access to the primary source of information.

It is to be understood that both the foregoing general description and the following detailed description are exemplary and explanatory only and are not restrictive of the invention, as claimed.

DESCRIPTION OF THE EMBODIMENTS

Reference will now be made in detail to the present invention, examples of which are illustrated in the accompanying drawings. Wherever possible, the same reference numbers will be used throughout the drawings to refer to the same or like parts.

Overview

Methods and systems consistent with the principles of the present invention provide for a user to request information over a network and receive the requested information through one or more information channels. A user, through a client device, may access, through a network, a web page that is hosted on a server. The server, while providing primary information, may further provide an opportunity for the user to request secondary information. The user may request access to the secondary information, while maintaining access to the primary information. Included in the request may be a channel selection, and associated channel selection information, through which the user wishes to receive the information.

System Architecture

Figure 1:
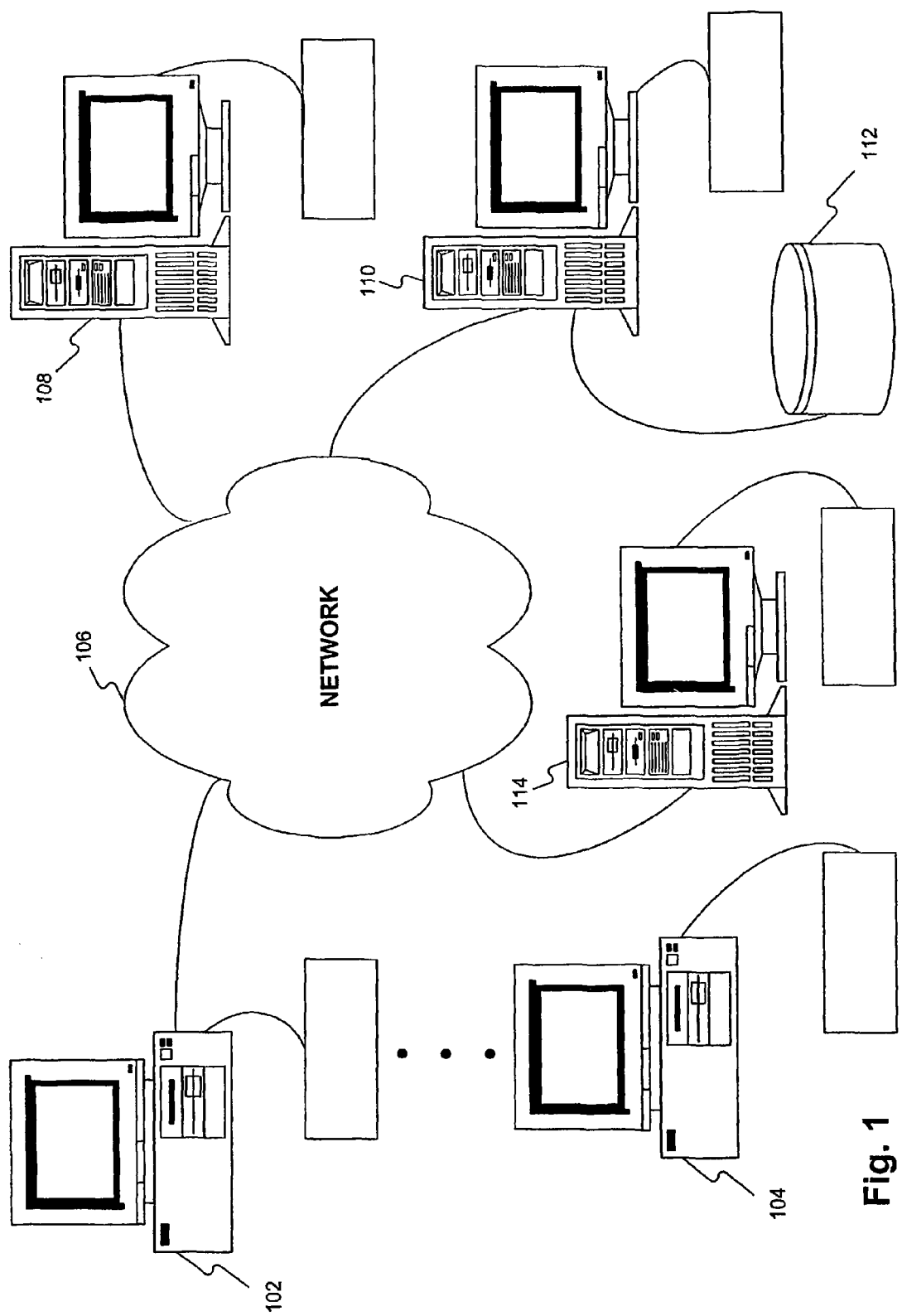
FIG. 1 depicts an exemplary computer system environment in which systems and methods, consistent with the principles of the present invention, can be implemented.

FIG. 1 is an exemplary diagram of the components of a system environment 100 in which systems and methods consistent with the principles of the present invention may be implemented. The components of system 100 may be implemented through any suitable combination of hardware, software, and/or firmware. As shown in FIG. 1, system 100 may include a number of devices, including a plurality of client devices 102 and 104, a network 106, a server 108, a content server 110, an information database 112, and a solicitor or advertiser server 114. Client devices 102 and 104 may be implemented as personal computers (hereinafter 'PCs') or workstations or, in the alternative, may be servers through which client devices may access network 106. Client devices 102 and 104 may further be implemented as a dedicated web browsing device, a public information kiosk, a Personal Digital Assistant (PDA), a cellular telephone, or any other type of device which can interface with network 106.

While only two client devices 102 and 104 are illustrated in FIG. 1, it can be appreciated by one of ordinary skill in the art that any number of client devices may be connected to network 106. Further, while only one server 108 is depicted in FIG. 1, it can be appreciated by one of ordinary skill in the art that multiple servers may exist on network 106 whereby client device 102 and/or 104 may access primary information and submit requests for secondary information.

Network 106 may be implemented through any suitable combination of communication networks including, for example, the Internet, or as any other type of network including a wide-area network, a local-area network, or a wireless network. Client devices 102 and 104 may access server 108 through network 106.

Content server 110 may be implemented as a server on network 106 that contains data files related to opportunities to request secondary information, e.g., solicitations and/or banner advertisements. These data files may include, for example, image files that appear in web pages in the form of, for example, solicitations or banner advertisements and include opportunities to request secondary information while the web page itself contains primary information. The data files may also include HyperText Transfer Protocol (HTTP) links to the solicitor's or advertiser's server on network 106.

Additionally, the data files may also contain secondary information relating to the solicitation or advertisement. For example, if the banner advisement was related to a credit card company offering a 3.9% interest rate, the secondary information may include the terms of the offer, e.g., 3.9% interest rate on new purchases, or purchases at a particular store, etc. The data files that contain secondary information may be stored in various file formats. Thus, if a user is requesting the secondary information by facsimile, the data file would be in a format suitable for faxing. Some or all of these data files may be stored on content server 110, or alternatively, in database 112. Content server 110 may provide the solicitations and/or banner advertisements to server 108 for display and access on web pages hosted by server 108. Content server 110 may further provide secondary information to a user or to server 108.

Server 114 may be implemented as a solicitor's or advertiser's server on network 106. Secondary information may be requested from server 114 by client devices 102 and 104, server 108, or content server 110.

Figure 2:
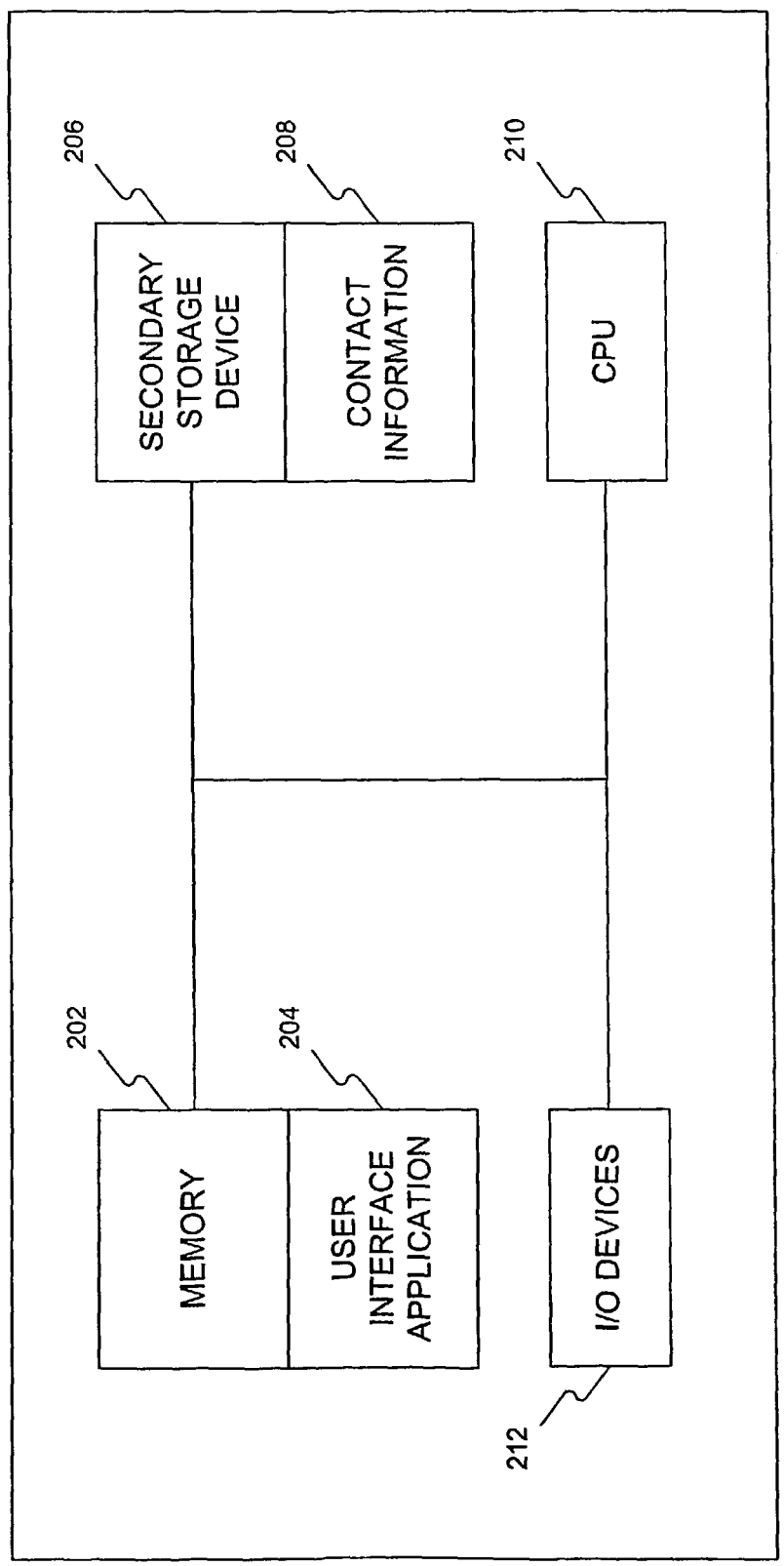
FIG. 2 is an exemplary diagram of the main components of a client device consistent with the principles of the present invention.

FIG. 2 depicts an exemplary diagram of client device 102 that may be implemented in system environment 100, consistent with the principles of the present invention. It can be appreciated that the configuration of client device 102 may be similar for all client devices 102 and 104. Client device 102 includes a memory 202, a user interface application 204 contained in memory 202, a secondary storage device 206, contact information 208, a central processing unit (CPU) 210, and input/output devices 212. Memory 202 contains instructions, including user interface application 204, for execution by CPU 210. User interface 204 may be implemented as a conventional browser application, including conventional browser applications available from Microsoft or Netscape. User interface application 204 may also contain an applet, a Java™ program, which may contain instructions to add features and capabilities for use with the conventional browser applications. A user can launch user interface application 204 through input/output devices 212 and access server 108 through network 106. Input/output devices 212 may include a keyboard, a mouse, a display, a storage device, a smart card reader, and/or a printer.

Contact information 208 may contain information relating to how to contact the user, e.g., e-mail addresses, residence addresses, post office addresses, business addresses, telephone numbers, facsimile numbers, etc. Further, it can be appreciated that contact information 208 may be stored on a smart card that can be read by the smart card reader of device 212 for implementation consistent with principles of the present invention. It can further be appreciated that contact information 208 may reside at server 108.

Figure 3:
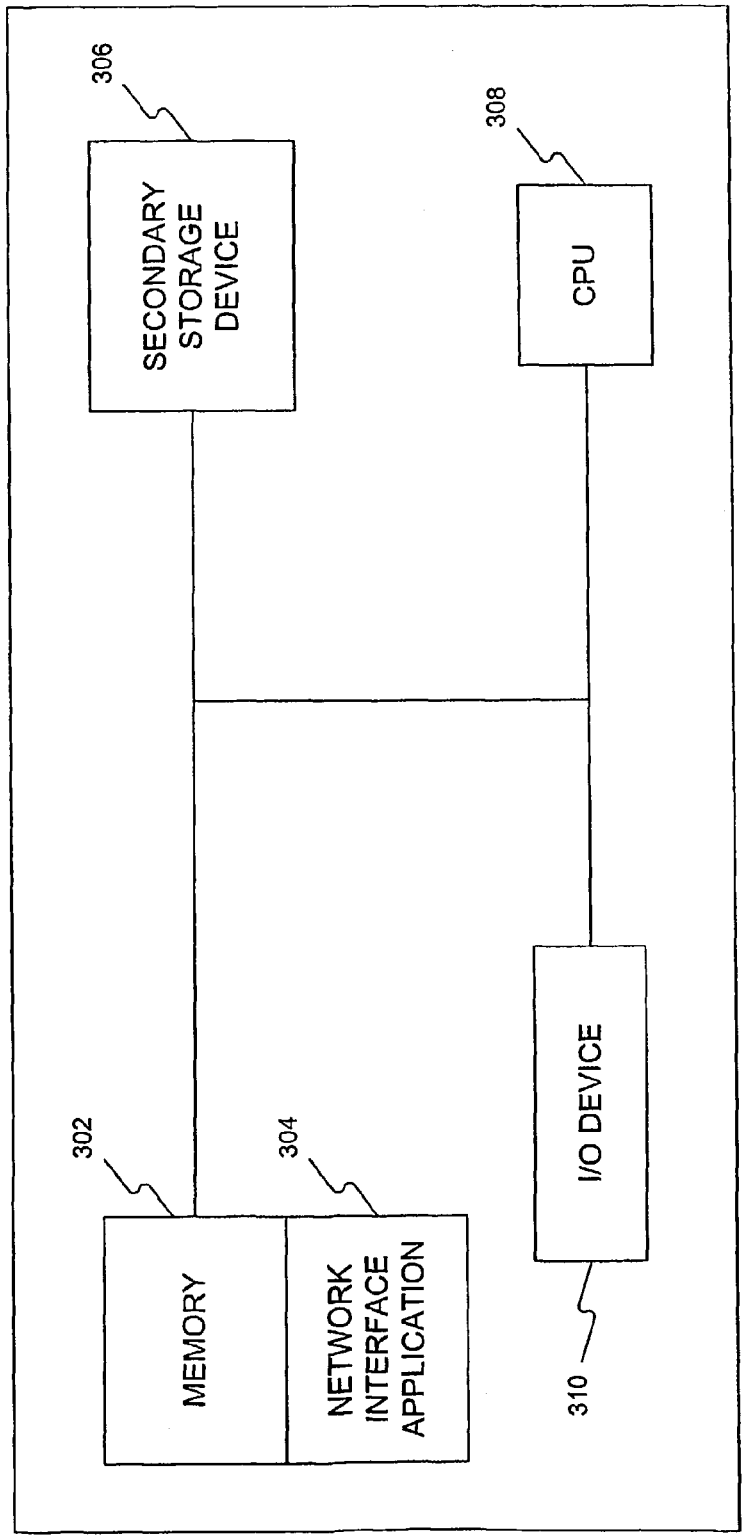
FIG. 3 is an exemplary diagram of the main components of a server computer consistent with the principles of the present invention.

FIG. 3 depicts an exemplary diagram of server 108 that may be implemented in system environment 100, consistent with the principles of the present invention. As shown in FIG. 3, server 108 includes a memory 302, a network interface application 304 contained in memory 302, a secondary storage device 306, a CPU 308, and input/output devices 310. Server 108 is connected to network 106 and may be accessed by client devices 102 and 104 for accessing and soliciting information. Server 108 further may be accessed by content server 110 through network 106. Memory 302 contains instructions, including network interface application 304, for execution by CPU 310. Network interface application 304 may include an application programmed in, for example, Active Server Pages (ASP), Coldfusion, Pearl, etc. whereby the user interface application 204 may communicate with network interface application 304. Input/output devices 312 may include a keyboard, a mouse, a display, a storage device, and/or a printer.

Figure 4:
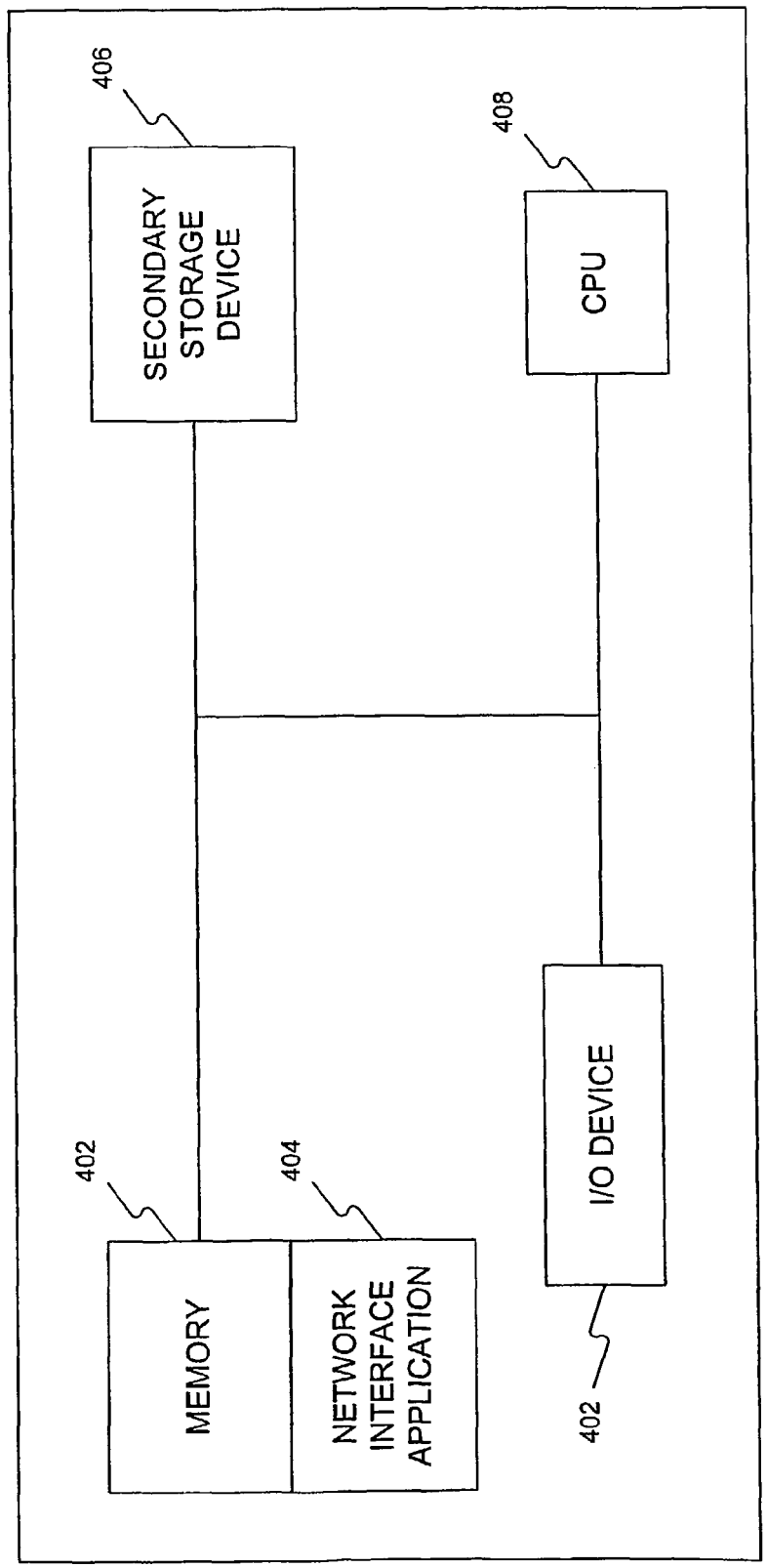
FIG. 4 is an exemplary diagram of the main components of a content server computer consistent with the principles of the present invention.

FIG. 4 depicts an exemplary diagram of content server 110 that may be implemented in system environment 100, consistent with the principles of the present invention. As shown in FIG. 4, content server 110 includes a memory 402, a network interface application 404 contained in memory 402, a secondary storage device 406, a CPU 408, and input/output devices 410. Content server 110 is connected to network 106 and may be accessed by server 108 for requesting secondary information. Memory 402 contains instructions, including network interface application 404, for execution by CPU 410. Input/output devices 412 may include a keyboard, a mouse, a display, a storage device, and/or a printer. It can be appreciated by one of ordinary skill in the art that the information contained in information database 112 may be stored in secondary storage device 306 in content server 110.

Implementation

Figure 5:
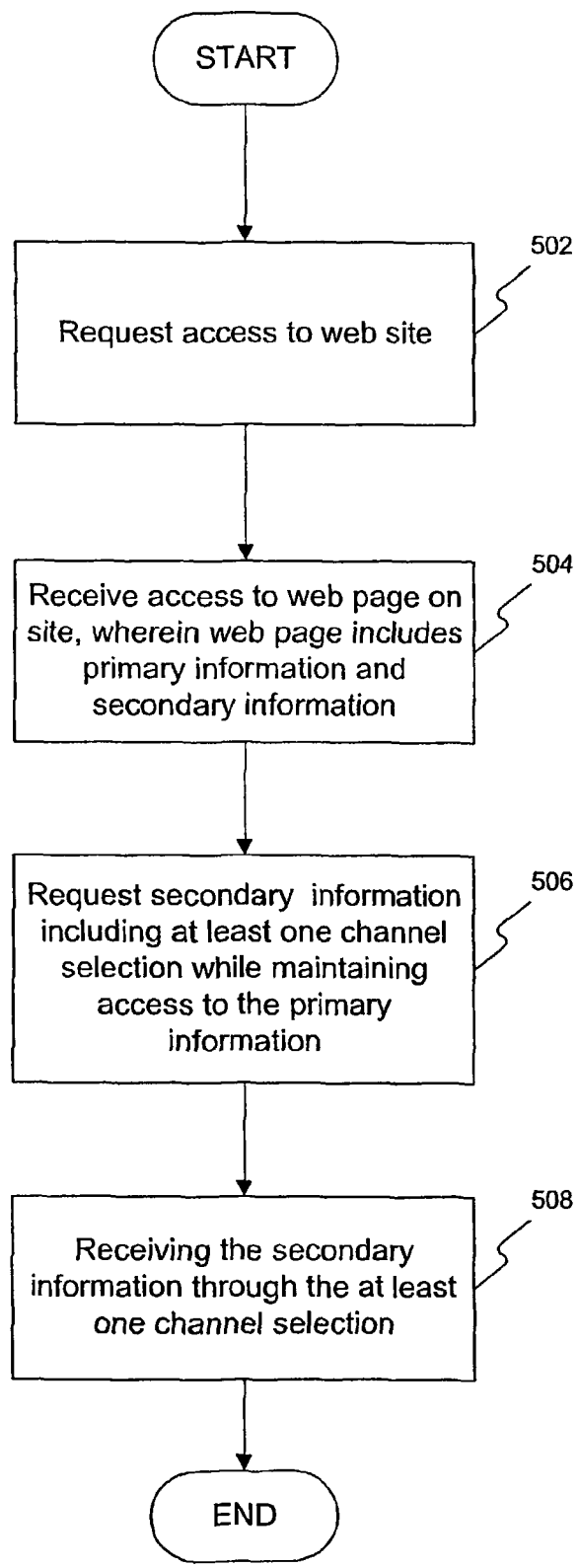
FIG. 5 depicts an exemplary flow chart of a method for requesting access to secondary information, consistent with the principles of the present invention.

FIG. 5 depicts an exemplary flow chart of a method performed by a client device in requesting access to secondary information, consistent with the principles of the present invention. Client device 102, through user interface application 204, requests access 108 through network 106 to a web page on a site generated in network interface application 304 on server (Stage 502). Client device 102 receives access to the web page, which includes primary information and an opportunity to request secondary information (Stage 504). For example, if the web page URL is www.news.com, the information relating to news on the web page may be considered the primary information. Other information relating to, e.g., solicitations or advertisements, provides the user an opportunity to request secondary information. For example, many companies that provide web pages now allow other companies to post solicitations or banner advertisements on their web page. These solicitations or banner advertisements may be considered an opportunity to request secondary information.

The user, wishing to receive additional information relating to the secondary information, may submit a request through client device 102 for the secondary information while maintaining access to the primary information. Included in the request may be at least one channel selection through which the user wishes to receive the secondary information (Stage 506). For example, the channels may include e-mail; facsimile; telephone; regular mail to a residence, post office box, or business address; etc. Once the user submits the request using client device 102, the user may then receive the secondary information through the channel, or channels, that were designated in the request for the information (Stage 508).

It can be appreciated by one of ordinary skill in the art that these steps may be performed by client device 104, or any other client device that can access a web page on server 108.

Figure 6:
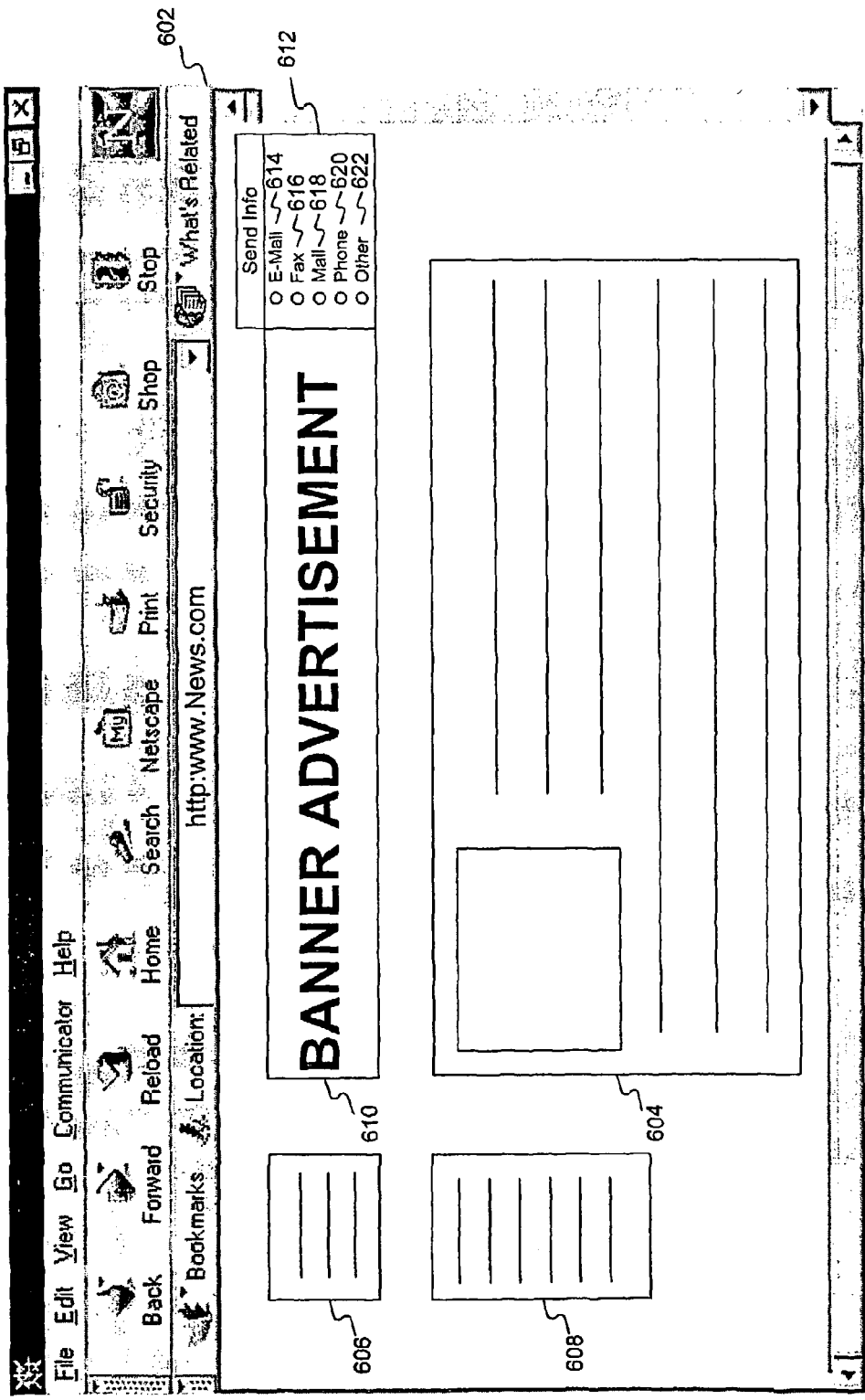
FIG. 6 depicts an exemplary image presented to a user when accessing a web page on a server, consistent with the principles of the present invention.

FIG. 6 depicts an exemplary image presented to a user when accessing a web page on server 108. As shown in FIG. 6, a web page 602 is displayed. Web page 602 may include primary information 604, 606, 608, and a mechanism 610 to request secondary information. In this example, secondary information mechanism 610 is implemented as a solicitation in a banner advertisement. Channel selection options 612 may be included in banner advertisement 610. It can be appreciated by one of ordinary skill in the art that the channel selection options 612 may be enabled or disabled by content server 110 or solicitor's or advertiser's server 114, depending on channels through which the servers are capable of transmitting the information.

Figure 7:
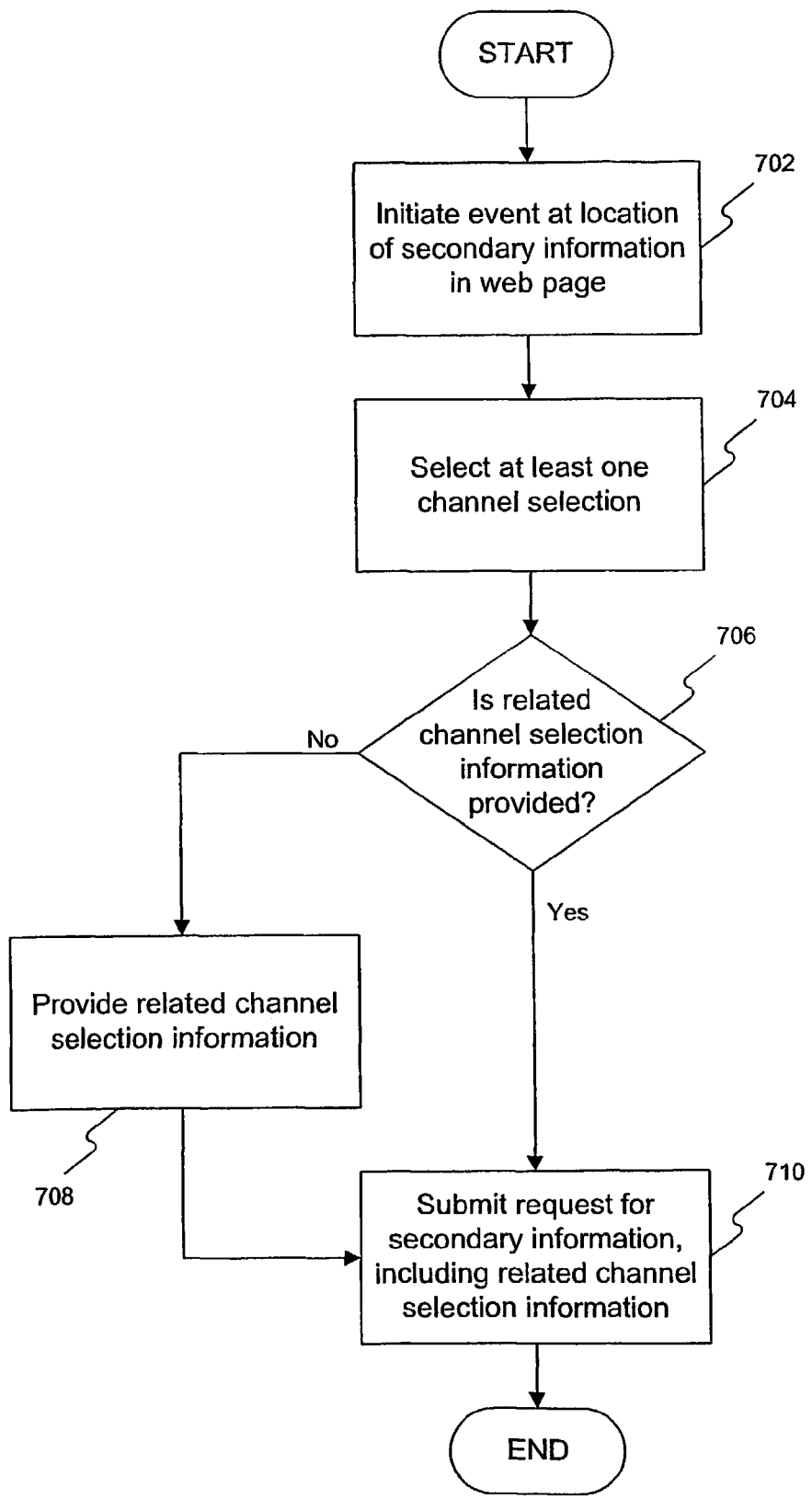
FIG. 7 depicts an exemplary flow chart of a method for requesting access to secondary information including channel selection, consistent with the principles of the present invention.

FIG. 7 depicts an exemplary flow chart of the steps performed by a client device in requesting access to secondary information and including in the request channel selection, consistent with the principles of the present invention. When a user wishes to request access to secondary information on a web page, he initiates an event at the location of the secondary information on the web page (Stage 702). For example, he may move his user input device 212, e.g., a mouse, over the location of the solicitation, or banner advertisement, on the display screen.

The user then, through the user input device 212, selects at least one channel selection through which the secondary information may be provided (Stage 704). This may be accomplished by selecting, through the user input device 212, at least one of the channel selections displayed in the channel selection options 612 (FIG. 6). For example, if the user wanted to receive the secondary information via e-mail, the user would 'click' on e-mail 614 using the left button on the mouse. Alternatively, if the user wanted to receive the secondary information via facsimile, the user would 'click' on fax 616. A similar process would be used for the channel selection for physical mail 618, including, for example, residential or business mail, phone 620, or other 622, which may include other channels the user may receive the information through.

Referring to FIG. 7, the system then determines whether the related channel selection information is available (Stage 706). The system may accomplish this by determining if the user's contact information is stored in the system. For example, the contact information may be stored in a "cookie", that is a data packet including information sent by a server to a client device and stored on the client device for future access by the server. Alternatively, the contact information may be stored in a smart card, which can be read by a smart card reader and uploaded to user interface application 204 in client device 102 (FIG. 2). In yet another alternative, the contact information may have been transmitted to server 108 upon initial access by client device 102 to web page 602. For example, if the user accessed a web page that requires the user register in order to access the web page, the contact information may already be stored on the server.

If the related channel selection information is not provided (Stage 706, No), the user may provide the related channel selection information (Stage 708). This may occur by providing to the user a pop-up window that appears in front of the window containing the web page 602 display, thereby maintaining access to the primary information.

Figure 8:
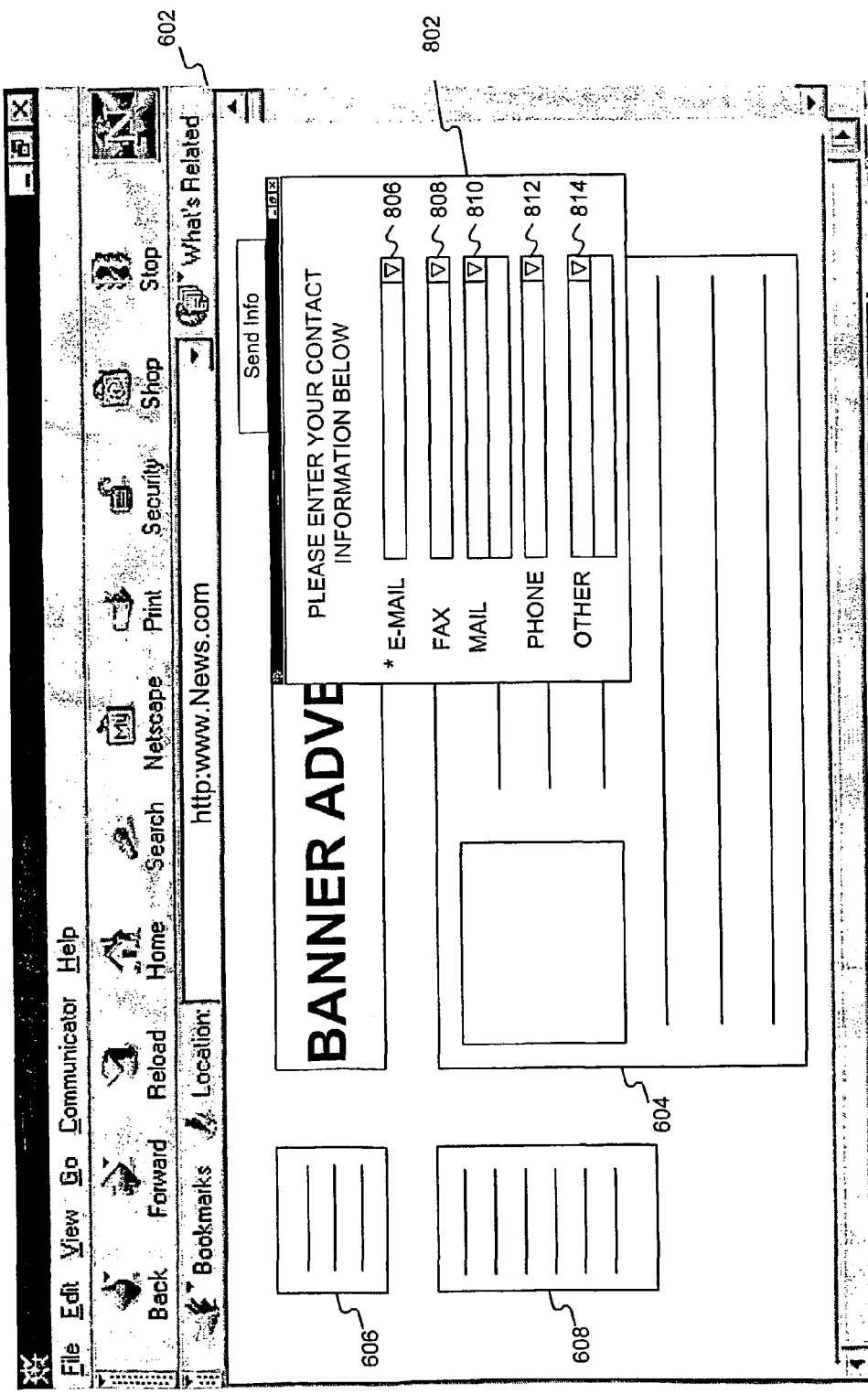
FIG. 8 depicts an exemplary image that may be presented to a user when providing information related to at least one channel selection, consistent with the principles of the present invention.

FIG. 8 depicts an exemplary image presented to a user to solicit the user to provide information related to at least one channel selection. As shown in FIG. 8, web page 602 is displayed in the background and a pop-up window 802 is displayed in front of web page 602. Thus, the connection to server 108 is maintained while the user has the opportunity to enter contact information to complete the request for secondary information. If the user selected e-mail 614 (FIG. 6) in Stage 704 (FIG. 7), an indicator 804, such as an asterisk, would appear in the pop-up window next to an e-mail field 806 indicating the user needs to provide an e-mail address designating where the secondary information is to be sent. Similarly, if the user selected fax 616 in Stage 704, indicator 804 would appear next to a fax field 808. If the user selected mail 618 in Stage 704, an asterisk 804 would appear next to a mail field 810.

Alternatively, an additional field may be presented to the user requesting whether the mailing address provided is a residence or a business address. If the user selected phone 620 in Stage 704, an asterisk 804 would appear next to phone field 812. If the user selected other 622, an asterisk 804 would appear next to other field 814. If the user wanted to receive the secondary information through more than the one channel selected, the user may supply information in those fields relating to all the channel selections desired by the user.

It can be appreciated by one of ordinary skill in the art that the display features of the pop-up window may be displayed to the user in alternative formats. For example, the pop-up window may only include those fields related to the channel selection that the user selected in Stage 704.

If the system determines that the information related to the channel selection is provided (FIG. 7, Stage 706, Yes), then the system submits a request for secondary information, including the related channel selection information, e.g. the contact information (FIG. 7, Stage 710). This may be implemented in a number of ways. For example, the request may be submitted to the server 108, wherein server 108 would respond to the request by providing the secondary information directly to the user. That is, the server 108 may send an e-mail (assuming the user selected e-mail 614 as the channel selection) to the user, including in the e-mail information related to the solicitation or banner advertisement. Alternatively, the request may be submitted directly to server 114, for example, by using a POST command to the HTTP link embedded in the solicitation or banner advertisement. Server 114 may then send the information to the user using the channel selections included in the request. In another alternative, the request may be submitted, either directly or through server 108, to content server 110. Content server 110 may then access the secondary information, from either secondary storage device 406 or database 112, and respond to the request, by supplying the secondary information, using the channel selection. If content server 110 does contain the secondary information, content server 110 may request the information from the solicitor's or advertiser's server 114. Then, when the content server 110 receives the information, content server 110 may forward the information to the user using the specified channels. Alternatively, content server 110 may forward the request to solicitor's or advertiser's server 114 wherein solicitor's or advertiser's server 114 may respond to the request.

It can be appreciated by one of ordinary skill in the art that once the request has been submitted for the secondary information, the user may receive an acknowledgement that the request has been transmitted and/or received by the device that will respond to the request. It can further be appreciated that this acknowledgement capability may be turned off through the user interface application by the user.

Figure 9:
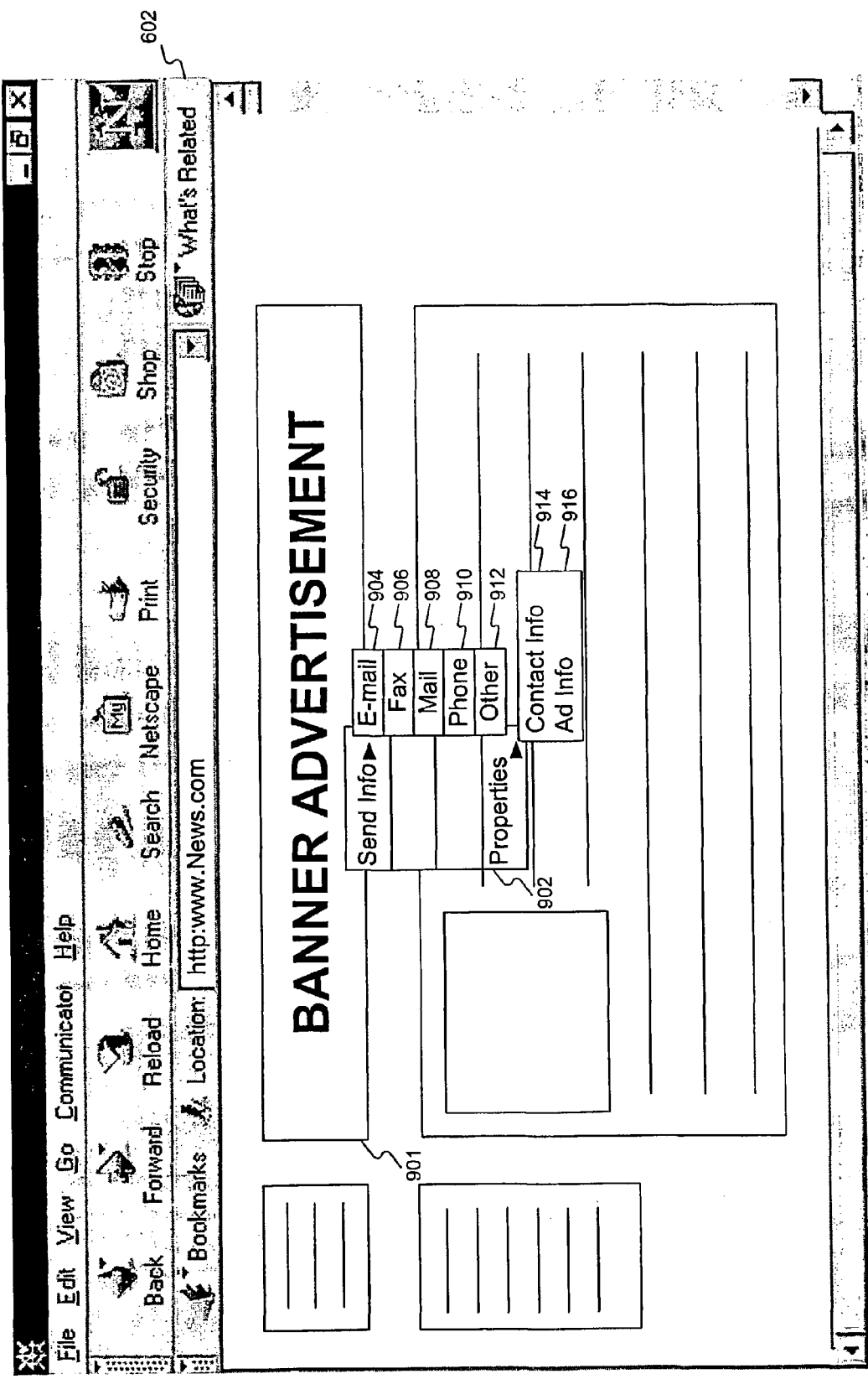
FIG. 9 depicts an alternative exemplary image that may be presented to a user when accessing a web page on a server, consistent with the principles, of the present invention.

An alternative to embedding the channel selection options in the solicitation or banner advertisement, as shown in FIG. 6, provides for including the channel selections in another event after the user accesses the server 108's web site. For example, in initiating an event at the location of the banner advertisement or solicitation in the web page (FIG. 7, Stage 702), the user may move his user input device 212, e.g., his mouse, to any location over the solicitation or banner advertisement and right click. FIG. 9 displays an exemplary image presented to the user upon accessing web page on server 108 and performing a right click event when the user input device 212 is over the solicitation or banner advertisement. The display of FIG. 9 may be implemented using an applet for enhancing the features contained in a conventional user interface application.

As shown in FIG. 9, web page 602 is depicted with banner advertisement 901. Banner advertisement 901 is displayed in a different format than that of banner advertisement 610, in that the channel selection options are not listed. It can be appreciated by one of ordinary skill in the art that this alternative may be implemented where the channel selections are included in the banner advertisement, thus the user may have two alternative methods for selecting the channel selection. Once the right click event occurs, box 902 appears with options for the user. For example, the user may select send info, which contains a pull-down menu, including channel selections e-mail 904, fax 906, mail 908, phone 910, and other 912. It can be appreciated by one of ordinary skill in the art that pull-down menu may include other channel selections. Once the user selects at least one channel selection (FIG. 7, Stage 704), the method proceeds with the processing as set forth above with regard to the discussion of FIG. 7.

Additionally, box 902 contains properties, which contains a pull-down menu including contact information 914 and advertisement information 916. Contact information 914 allows a user to input contact information for storage in e.g., secondary storage device 206, smart card device, etc., such that when the user accesses web pages including secondary information in the future, the user need not be prompted to enter the contact information when requesting secondary information. Advertisement information 916 may contain secondary information that the user can directly access while maintaining access to the primary information. It can be appreciated by one of ordinary skill in the art that properties may include other options, e.g., a privacy option whereby the user may view information relating to the privacy policies associated with the request for secondary information.

Figure 10:
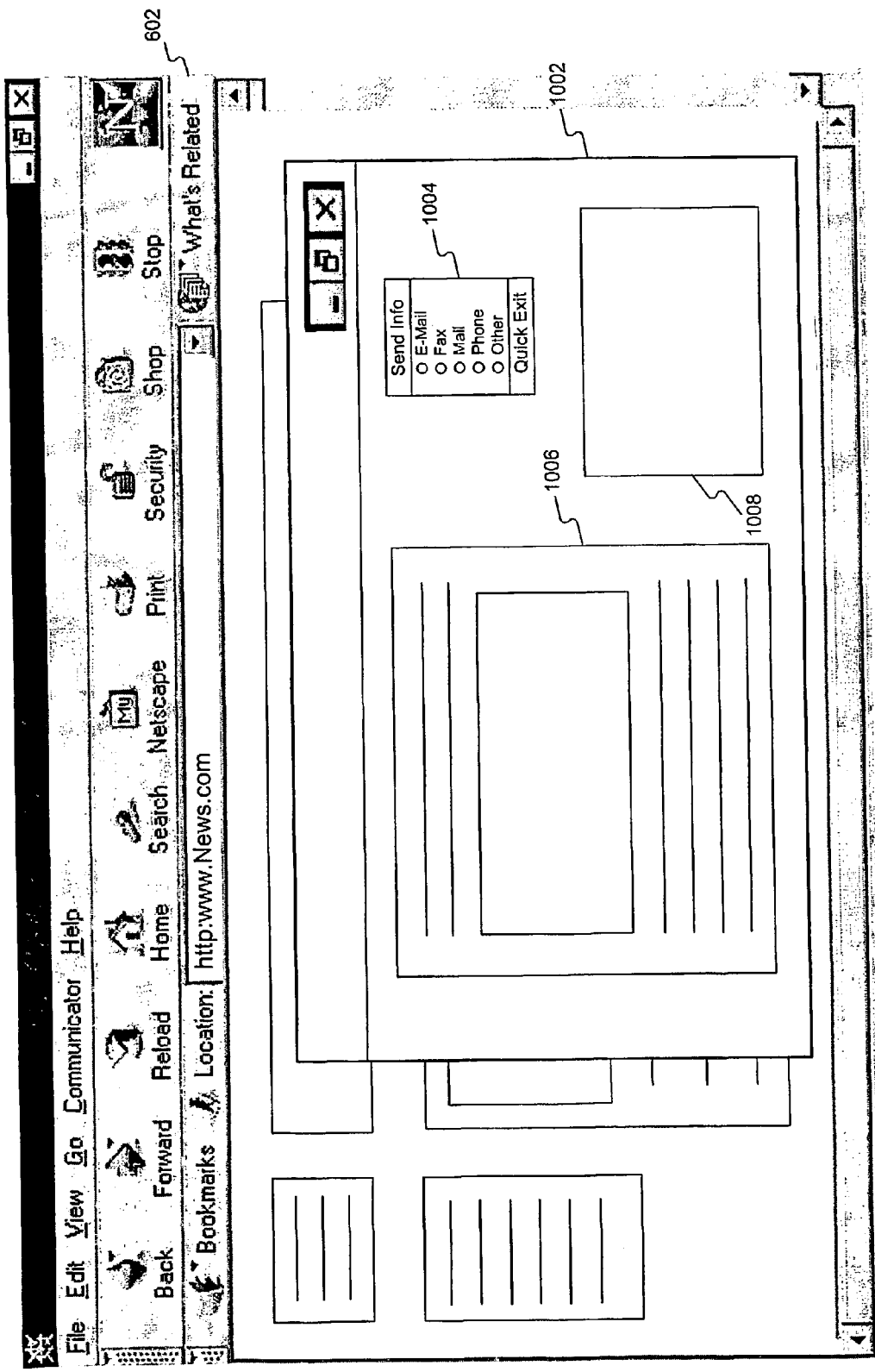
FIG. 10 depicts an exemplary image that may be presented to a user when accessing the secondary information directly while maintaining access to primary information, consistent with the principles of the present invention.

FIG. 10 depicts an exemplary display that may be presented to a user when accessing the secondary information directly by selecting properties and ad info 916. As shown in FIG. 10, a pop-up window 1002 appears with secondary information 1006, 1008 relating to the banner advertisement. Additional pop-up windows may appear if the user wishes to view additional secondary information. Included in pop-up window 1002 is an option box 1004, which includes channel selection options, should the user wish to have the secondary information sent to them via a channel selection. Also included in option box 1004 is a quick exit option 1006. This feature allows a user to exit out of the pop-up window 1002 and return to web page 602, without having to exercise his browser BACK out of each pop-up window or close each pop-up window separately.

Figure 11:
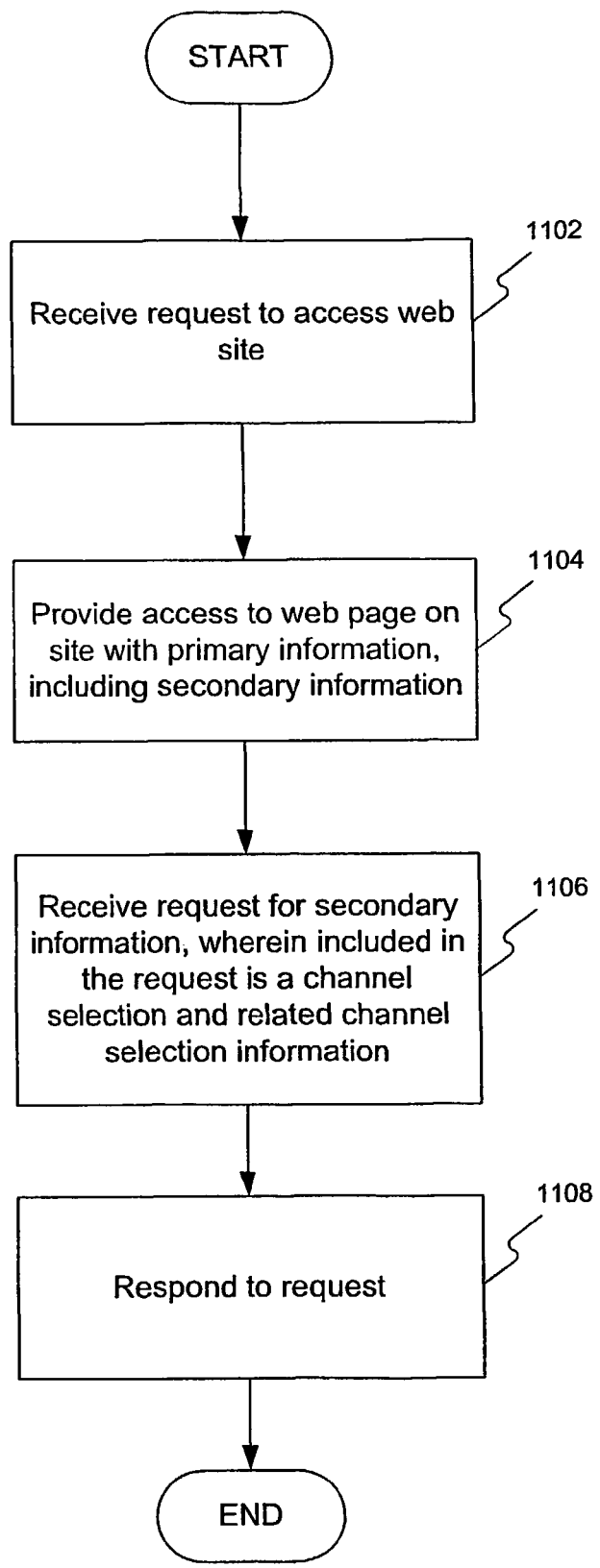
FIG. 11 depicts an exemplary flow chart of the steps performed by a server in providing access to secondary information, consistent with the principles of the present invention.

FIG. 11 depicts an exemplary flow chart of the steps performed by a server in providing access to secondary information, consistent with the principles of the present invention. Server 108 receives a request from client device 102 to access a web page on the site (Stage 1102). Server 108 provides access to a web page, wherein the web page includes is primary information and an opportunity for the user to request secondary information (Stage 1104). Server 108 then receives a request by client device 102 for secondary information. Included in the request may be one or more channel selections and related channel selection information (Stage 1106).

Server 108 then responds to the request (Stage 1108). In responding to the request, server 108 may send the secondary information directly to the user through the appropriate channel selection. This information may be sent electronically, e.g., through conventional e-mail protocols, file transfer protocols, etc., or may be sent by regular mail. Further, this information may be transferred by a human voice over a telephone. Alternatively, server 108 may request the secondary information from content server 110. Once the secondary information is received from content server 110, server 108 then forwards the secondary information to the user using the appropriate channel selections. In another alternative, server 108 may forward the request to content server 110, whereby content server 110 would respond to the request. In yet another alternative, server 108 may forward the request directly to the solicitor's or advertiser's server 114, whereby server 114 would respond to the request.

It can be appreciated by one of ordinary skill in the art that server 108 may further send the request to a mail server, not shown, on network 106 to fulfill a physical mail request. Similarly, it can be appreciated by one of ordinary skill in the art that server 108 may further send the request to an e-mail server, not shown, on network 106 to fulfill an e-mail request. It can further be appreciated by one of ordinary skill in the art that server 108 may send the request to a facsimile server, not shown, on network 106 to fulfill an e-facsimile request.

CONCLUSION

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

What is claimed is:

1. A computer-implemented method for providing access to secondary information while maintaining access to primary information, comprising the following steps performed by a processor:
    displaying, on a display device via a user interface application, a web page comprising primary information and at least one advertisement, wherein the at least one advertisement includes an associated pull-down menu that is both selectable to access secondary information associated with the advertisement via the user interface application and selectable to access secondary information associated with the advertisement via an alternative channel;
    receiving, via the user interface application, a user request to access the at least one advertisement via the alternative channel, wherein the user request is distinct from a request to access the at least one advertisement via the user interface application;
    displaying, in response to the user request to access the at least one advertisement via the alternative channel and in conjunction with the primary information, a graphical user interface comprising a plurality of graphical icons associated with a plurality of alternative channels for providing secondary information associated with the advertisement;
    receiving, from the user, at least one channel selection from among the plurality of alternative channels associated with the displayed plurality of graphical icons for providing the secondary information;
    determining whether channel information corresponding to the channel selection and associated with the user is stored in association with the user interface application;
    when the channel information is not stored in association with the user interface application:
        displaying, in response to the user channel selection and in conjunction with the primary information, a graphical user interface element that solicits associated channel information from the user;
        receiving, from the user, the associated channel information; and
    sending a request for the secondary information along with the selected channel and the associated channel information to a server for providing the secondary information through the at least one channel selection, while displaying the web page comprising the primary information on the display device.

2. The computer-implemented method of claim 1, wherein the channel selection includes at least one of e-mail, facsimile, mail, or telephone.

3. The computer-implemented method of claim 1, wherein the at least one advertisement comprises a banner advertisement.

4. The computer-implemented method of claim 3, wherein the banner advertisement comprises embedded channel selection options.

5. The computer-implemented method of claim 1, wherein displaying the graphical user interface comprising the plurality of graphical icons associated with the plurality of alternative channels further includes:
    receiving a signal from a user input device.

6. The computer-implemented method of claim 1, wherein the server comprises at least one of a content server or an advertiser's server.

7. An apparatus for providing access to secondary information while maintaining access to primary information, comprising:
    a memory for storing program instructions;
    a display screen; and
    a processor for executing the program instructions to perform a method comprising:
        displaying, on the display screen via a user interface application, a web page comprising primary information and at least one advertisement, wherein the at least one advertisement includes an associated pull-down menu that is both selectable to access secondary information associated with the advertisement via the user interface application and selectable to access secondary information associated with the advertisement via an alternative channel;
        receiving, via the user interface application, a user request to access the at least one advertisement via the alternative channel, wherein the user request is distinct from a request to access the at least one advertisement via the user interface application;
        displaying, in response to the user request to access the at least one advertisement via the alternative channel and in conjunction with the primary information, a graphical user interface comprising a plurality of graphical icons associated with a plurality of alternative channels for providing secondary information associated with the advertisement;
        receiving, from the user, at least one channel selection from among the plurality of alternative channels associated with the displayed plurality of graphical icons for providing the secondary information;
        determining whether channel information corresponding to the channel selection and associated with the user is stored in association with the user interface application;
        when the channel information is not stored in association with the user interface application:

displaying, in response to the user channel selection and in conjunction with the primary information, a graphical user interface element that solicits associated channel information from the user;

receiving, from the user, the associated channel information; and sending a request for the secondary information along with the selected channel and the associated channel information to a server for providing the secondary information through the at least one channel selection, while displaying the web page comprising the primary information on the display screen.

8. The apparatus of claim 7, wherein the channel selection includes at least one of e-mail, facsimile, mail, or telephone.

9. The apparatus of claim 7, wherein the at least one advertisement comprises a banner advertisement contained in a web page.

10. The apparatus of claim 9, wherein the banner advertisement comprises embedded channel selection options.

11. The apparatus of claim 7, wherein the processor is further configured to display the graphical user interface comprising the plurality of graphical icons associated with the plurality of alternative channels in response to receiving a signal from a user input device.

12. The apparatus of claim 7, wherein the server comprises at least one of a content server or an advertiser's server.

13. A non-propagating tangible computer-readable medium containing instructions which, when executed by a processor, perform a method for providing access to secondary information while maintaining access to primary information, the method comprising:

displaying, on a display device via a user interface application, a web page comprising primary information and at least one advertisement, wherein the at least one advertisement includes an associated pull-down menu that is both selectable to access secondary information associated with the advertisement via the user interface application and selectable to access secondary information associated with the advertisement via an alternative channel;

receiving, via the user interface application, a user request to access the at least one advertisement via the alternative channel, wherein the user request is distinct from a request to access the at least one advertisement via the user interface application;

displaying, in response to the user request to access the at least one advertisement via the alternative channel and in conjunction with the primary information, a graphical user interface comprising a plurality of graphical icons associated with a plurality of alternative channels for providing secondary information associated with the advertisement;

receiving, from the user, at least one channel selection from among the plurality of alternative channels associated with the displayed plurality of graphical icons for providing the secondary information;

determining whether channel information corresponding to the channel selection and associated with the user is stored in association with the user interface application;

when the channel information is not stored in association with the user interface application:

displaying, in response to the user channel selection and in conjunction with the primary information, a graphical user interface element that solicits associated channel information from the user;

receiving, from the user, the associated channel information; and sending a request for the secondary information along with the selected channel and the associated channel information to a server for providing the secondary information through the at least one channel selection, while displaying the web page comprising the primary information on the display device.

14. The non-propagating tangible computer-readable medium of claim 13, wherein the channel selection includes at least one of e-mail, facsimile, mail, or telephone.

15. The non-propagating tangible computer-readable medium of claim 13, wherein the at least one advertisement comprises a banner advertisement contained in a web page.

16. The non-propagating tangible computer-readable medium of claim 15, wherein the banner advertisement comprises embedded channel selection options.

17. The non-propagating tangible computer-readable medium of claim 13, wherein displaying the graphical user interface comprising a plurality of graphical icons associated with the plurality of alternative channels further includes:

receiving a signal from a user input device.

18. The non-propagating tangible computer-readable medium of claim 13, wherein the server comprises at least one of a content server or an advertiser's server.

19. A system for providing access to secondary information while maintaining access to primary information, comprising:

a client device for:

displaying, via a user interface application, a web page comprising the primary information and at least one advertisement associated with the secondary information, wherein the at least one advertisement includes an associated pull-down menu that is both selectable to access secondary information associated with the advertisement via the user interface application and selectable to access secondary information associated with the advertisement via an alternative channel, displaying, in response to receiving a signal indicative of a request to access secondary information associated with the advertisement via the alternative channel, wherein the signal is received from a user input device via interaction with the user interface application, a graphical user interface comprising a plurality of graphical icons associated with a plurality of alternative channels for providing the secondary information, enabling selection of at least one channel from among the plurality of alternative channels associated with the displayed plurality of graphical icons for receiving the secondary information while displaying the web page comprising the primary information, sending a user request for the secondary information and a selected channel for receiving the secondary information to a server;

determining whether channel information corresponding to the selected channel and associated with the user is stored on the client device;

when the channel information is not stored on the client device:

displaying, in response to the selected channel and in conjunction with the primary information, a graphical user interface element for soliciting associated channel information from the user;

sending associated channel information to the server; and a server for:

receiving the user request, selected channel, and associated channel information for providing the secondary information, and providing the secondary information through the at least one channel selection while the client device displays the web page comprising the primary information.

20. The system of claim 19, wherein the selected channel includes at least one of e-mail, facsimile, mail, or telephone.

21. The system of claim 19, wherein the at least one advertisement is a banner advertisement.

22. The system of claim 21, wherein the banner advertisement comprises embedded channel selection options.

23. The system of claim 19, wherein the server comprises at least one of a content server or an advertiser's server.

24. A non-propagating tangible computer-readable medium storing instructions which, when executed by a processor, perform a method for providing access to secondary information while maintaining access to primary information, the method comprising:

displaying, on a display device via a user interface application, a web page comprising primary information and at least one electronic solicitation including channel selection options embedded in the electronic solicitation for providing the secondary information, the channel selection options include at least one of e-mail, mail, or telephone, wherein the at least one electronic solicitation includes an associated pull-down menu that is both selectable to access secondary information associated with the electronic solicitation via the user interface application and selectable to access secondary information associated with the electronic solicitation via an alternative channel;

receiving, via the user interface application, a user request to access the at least one electronic solicitation, the user request including a designation of at least one channel selection option from the channel selection options embedded in the electronic solicitation for providing the secondary information via the alternative channel;

determining whether channel information corresponding to the channel selection and associated with the user is stored in association with the user interface application;

when the channel information is not stored in association with the user interface application:

displaying, in response to the user channel selection and in conjunction with the primary information, a graphical user interface element that solicits associated channel information from the user;

receiving, from the user, the associated channel information; and sending a request for the secondary information along with the selected channel and the associated channel information to a server for providing the secondary information through the at least one channel selection option, while displaying the web page comprising the primary information on the display device.

* * * * *